United States Patent [19]

Freer

[11] Patent Number: 4,658,633

[45] Date of Patent: Apr. 21, 1987

[54] APPARATUS AND METHOD FOR MEASURING PROPERTIES OF CYLINDRICAL OBJECTS

[75] Inventor: Edgar P. Freer, Simi Valley, Calif.

[73] Assignee: View Engineering, Inc., Simi Valley, Calif.

[21] Appl. No.: 798,736

[22] Filed: Nov. 15, 1985

[51] Int. Cl.⁴ ............................................. G01B 13/06
[52] U.S. Cl. ..................................................... 73/37.5
[58] Field of Search ...................... 73/37.5, 37.6, 37.7, 73/37, 41; 209/591; 364/563

[56] References Cited

U.S. PATENT DOCUMENTS

| | | | |
|---|---|---|---|
| 3,059,466 | 10/1962 | Urmenyi | 73/37.7 |
| 3,088,061 | 4/1963 | Smith | 73/37.7 X |
| 4,398,420 | 8/1983 | Haesen et al. | 364/563 X |

FOREIGN PATENT DOCUMENTS 555283  6/1977  U.S.S.R. ............................... 73/37.5

Primary Examiner—Stewart J. Levy
Assistant Examiner—Joseph W. Roskos
Attorney, Agent, or Firm—Bogucki, Scherlacher, Mok & Roth

[57] ABSTRACT

A system for rapidly measuring, during production, various properties of cylindrical products, such as aluminum cans, uses both optical and non-contact air gauge measurements. The system is configured with three dimensional control to receive cans for optical and air gauge analysis on a movable platform having spaced apart receiving positions. A video camera inspects and identifies cans in one position, using X, Y and Z axis control. Wall thickness is measured using a reference mandrel and a movable air gauge having an end nozzle directed toward a linear reference surface on the mandrel. The air gauge uses hydrodynamic balance to maintain a specified gap relative to the opposing surface, with a high degree of accuracy. Before a measurement is taken, the air nozzle is traversed along the length of the mandrel, and its position sensed and converted to digital form, with the recorded points being entered into storage. A can inserted on the mandrel is drawn tightly against the mandrel by vacuum pressure, and the air nozzle is run along the length of the can, with readings being taken at high speed but relatively small increments. These readings are then stored and utilized, in relation to the prior reference readings, to provide accurate mapping of all thicknesses to less than 1 micron. When one scan is completed, the can is released, rotated and again drawn onto to the reference mandrel for another in a series of readings providing rapid mapping of the entire surface.

22 Claims, 8 Drawing Figures

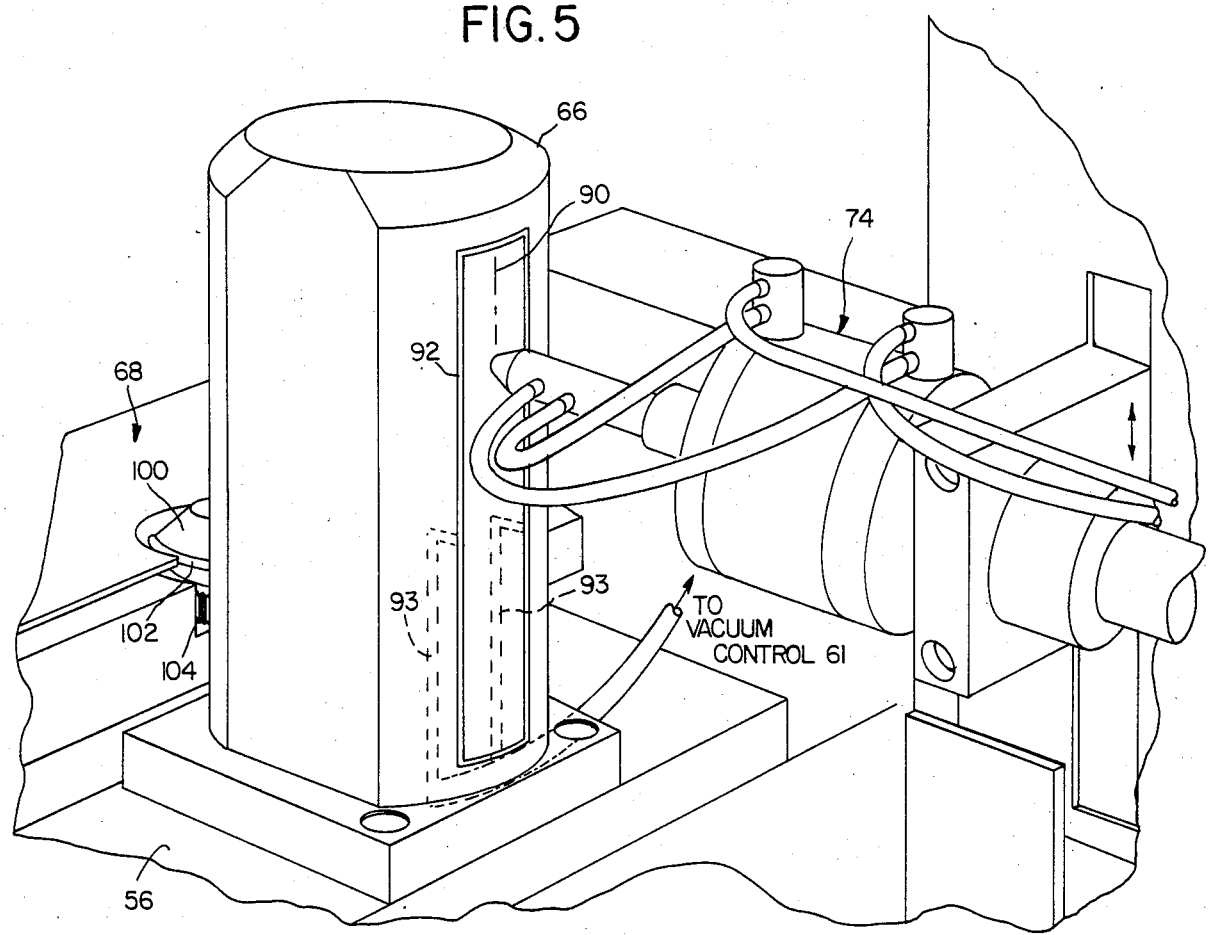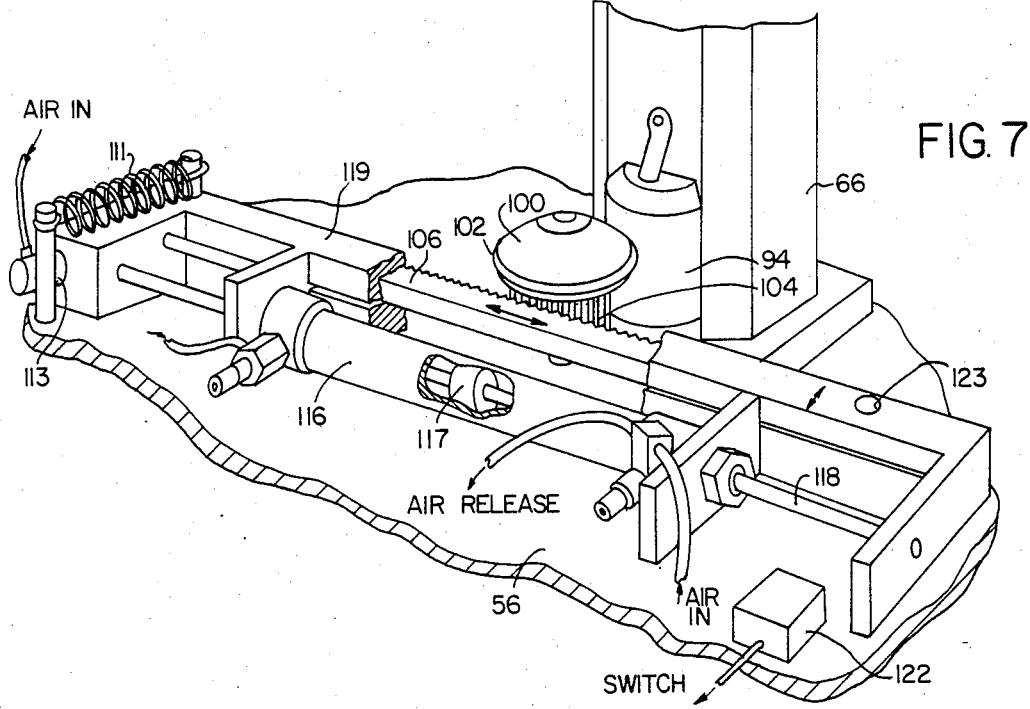

APPARATUS AND METHOD FOR MEASURING PROPERTIES OF CYLINDRICAL OBJECTS

BACKGROUND OF THE INVENTION

Modern manufacturing processes for cylindrical products enable high production throughrates to be maintained for substantial time intervals, in pressing, forging, stamping or molding such items. As the production system is operated, wear and distortion are introduced until a condition is reached at which the formed parts are no longer within established tolerances. Very often, the parts must have precisely controlled wall dimensions and curvatures to avoid catastrophic or damaging results in use. Open ended cylindrical members such as large heavy shell casings and other cylinders must have substantially uniform walls throughout their perimeter, to prevent overheating and jamming. At another extreme, aluminum cans used in the beverage industry must also be precisely controlled, because excess wall thickness is wasteful and costly, and inadequate wall thickness can involve sudden rupture.

The production of aluminum beverage cans using multiple high speed presses provides a good example of modern wall thickness measurement problems. Usage rates today for these cans are such that the typical facility comprises a number of high speed presses in parallel, each operating at high cycle rates (up to 1200 cans per minute) to form open ended cylinders which comprise all of the can body apart from the top, which is attached separately and later. In production, the can walls gradually change in thickness as the dies wear, until a point is reached at which that press must be shut down and the dies replaced or adjustments made. Although long term trends can sometimes be monitored, die life and press performance can vary substantially, and at times product changes can take place rapidly. The present approach toward quality assurance is for operators to manually select samples and then gauge wall thickness using micrometers. No matter how skilled and mechanically adept the operator, however, it is not feasible for him to keep current with the output rates of a number of high speed presses.

Furthermore, it is preferable to acquire more accurate and reliable data as to a number of can characteristics, using more sensitive measurement devices and eliminating operator judgments and mistakes. It is desirable to measure various critical curvatures at the top and bottom of the can, to gauge significant dimensions, and to take many wall readings, in effect mapping the wall thickness precisely at several hundred or more positions around and along the wall. Because the walls not only vary in thickness but are wavy along their length, and because the precision needed for the measurement is of the order of one micron (40 microinches) or less, the measurement problems are greatly compounded. Under these conditions, temperature effects, wall undulations, and other variations can introduce unacceptable errors in measurements. The wall is so thin that contact with a harder member can introduce scratches which themselves introduce errors. As cans emanate at high production rates from a group of presses, a non-contact measurement system is needed that selectively samples and transfers the cans, identifies the cans in accordance with the originating press, and maps wall thickness rapidly at a substantial number of points about the can, with sufficient accuracy to generate meaningful data as to press performance in real time.

SUMMARY OF THE INVENTION

An apparatus and method for noncontact, high speed, analysis of dimensions and geometries of open ended cylindrical members employs both optical and air gauge sensors in conjunction with a three-dimensional sensing system to identify the production source, measure exterior dimensions and map wall thickness at multiple points. The product after manufacture is placed at one of two reference positions on a platform positionable along one horizontal axis. When positioned on a first position an image camera is movable with a support along an orthogonal horizontal axis, and vertically relative to its support. The camera can be focused on the Z axis on different parts of the cylindrical object, and motion control along two axes in the horizontal plane can be used for image analysis and dimensional computations. When a cylindrical product is placed at the other position on the platform it registers about a reference member that is movable with the platform to a scanning position relative to an air gauge that traverses along a linear path. The surface of the wall of the cylindrical product facing the air gauge is drawn into intimate contact with the reference member, so that wall thickness variations appear as changes in the outer wall. The air gauge operates on a hydrodynamic balancing principle to maintain the sensor very precisely at a uniform spacing from the cylinder surface. Readings taken at different positions along the scan line are converted to digital form, compared to data derived from immediately preceding scans of the reference member itself, and stored. Readings are taken rapidly at a number of regions by rotating the cylindrical product to different angular positions and then scanning longitudinally along each angular position. The wall thickness for a product can thus thoroughly mapped with precision and high speed, and the product can be analyzed and measured by the image analysis subsystem. Such data is cumulatively stored and can be analyzed to provide a constant assessment of operating conditions at each of a number of production units.

In a more specific example of a system in accordance with the invention open ended aluminum cans moving along conveyer lines are selected periodically and conveyed to a staging area. A transfer system takes cans from the staging area and enters them into a computer controlled inspection machine including both a high precision optical inspection mechanism and a wall thickness measurement system. The inspection machine includes a reference base on which a platform is controllably movable in the Y direction. The platform includes a reference mandrel for receiving an inverted can for air gauge scanning, and a spaced apart reference position for holding a can with open side up, for optical inspection. A camera and illuminator system are movable in the X axis direction along an overlying stable bridge, and also controllable in the Z axis direction for focusing and lighting contrast. The optical system is thus movable, relative to the cans to be inspected, in three dimensional fashion, to perform such functions as identifying the originating press on the basis of a unique combination of marks impressed into the can base, and analyzing specific characteristics such as open end flange, bottom shape and can diameter. The wall thickness measurement system includes a straight and vertical reference mandrel having one curved side fitting within the curvature of an inverted can from the open end, and providing a positional reference line. The mandrel includes surface recesses about the reference line coupled via conduits to a vacuum source, so that the can surface can be flattened against the reference line. Any distortion thus introduced in the can is taken up in a compensating distortion of the free portion of the can. A traverse mechanism is mounted to scan the air gauge vertically along the reference line both before and after the can is fitted on the mandrel. The air gauge has an end nozzle directed toward the can and movable on a shaft that extends through the interior of an air cylinder of the type having an internal piston coupled to move with the nozzle, and using differential internal pressures and counteracting forces at the nozzle tip to precisely balance the nozzle at a given spacing from the immediately opposing can surface. When one scan is complete, the vacuum is released, and a drive roller outside the can presses it against a roller at the mandrel to rotate the can a selected amount, such as to the next quadrant. A rotary indexer comprising a pneumatically movable cylinder linearly movable between controllable limits is used to turn the can between scans. The scan is then repeated along each new line after the can is drawn against the mandrel by vacuum.

The mapping of wall thicknesses can be carried out within one minute and the complete optical inspection can be carried out within three minutes, assuring an adequately high sampling rate for real time monitoring of multiple presses forming cans at high rates. Furthermore, the digital data is stored in a data processor, which continually analyzes the data to establish the trend of variations in the individual presses, so that die life cycles and ultimate product may be accurately controlled.

BRIEF DESCRIPTION OF THE DRAWINGS

A better understanding of the invention may be had by reference to the following description, taken in conjunction with the accompanying drawings, in which:

FIG. 5 is a perspective fragmentary view of a mandrel and air gauge mechanism used in the arrangement of FIGS. 3 and 4;

FIG. 7 is a fragmentary perspective view, partially broken away, of a rotary indexer for use in the system.

DETAILED DESCRIPTION OF THE INVENTION

Figure 1:
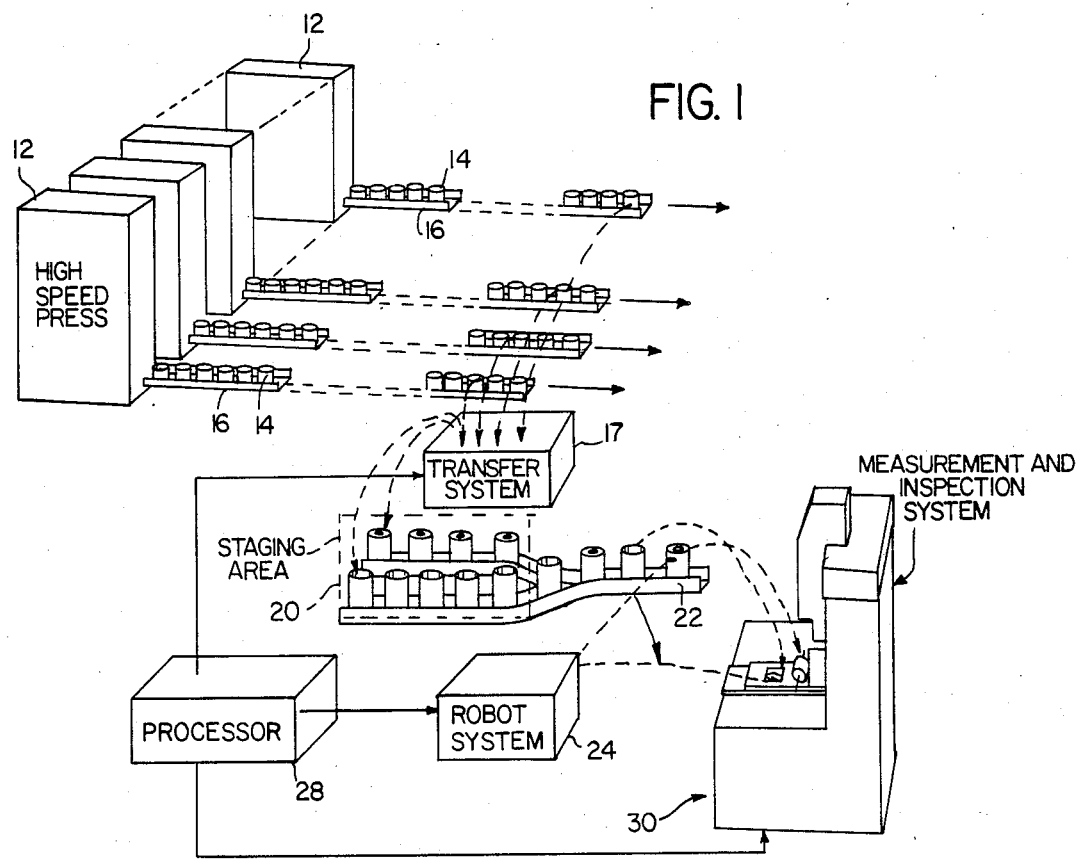
FIG. 1 is a simplified perspective and block diagram representation of the installation of an inspection system in accordance with the invention showing the manner of transfer from production machinery to the inspection system.

FIG. 1 depicts in somewhat simplified and idealized form the principal elements of an on-line inspection system including optical and air gauge measurement means for obtaining quality assurance data as to rapidly produced cylindrical products, here thin walled aluminum cans during production. A number of high speed can presses 12, each operating at typical repetition rates of up to 1200 cans/minute, feed open-ended cans 14 to conveyor lines 16 leading past a staging area 20. A transfer machine 17 (indicated only generally) or an operator sequentially takes sample cans 14 from each conveyor line 16 and places them in the staging area 20, which funnels the cans along conveyor lines 22. At the staging area 20 a robot mechanism 24 transfers a sampling of cans to a measurement and inspection system 30. All cans may be transferred, or only selected ones, in an arbitrary fashion. The cans are placed in upright (open end up) or inverted position in the staging area 20, in accordance with the test to be run. A processor 28, which may comprise a complex computer that performs many functions or a relatively straightforward sequential operating system, controls movement along the lines 16 and transfer from the staging area 20 to the measuring and inspection system 30. The robot mechanism 24 is commanded to deposit the cans 14 in upright (open end up) or inverted position at a predetermined one of two positions on a platform at the measuring and inspection system 30.

Figure 2:
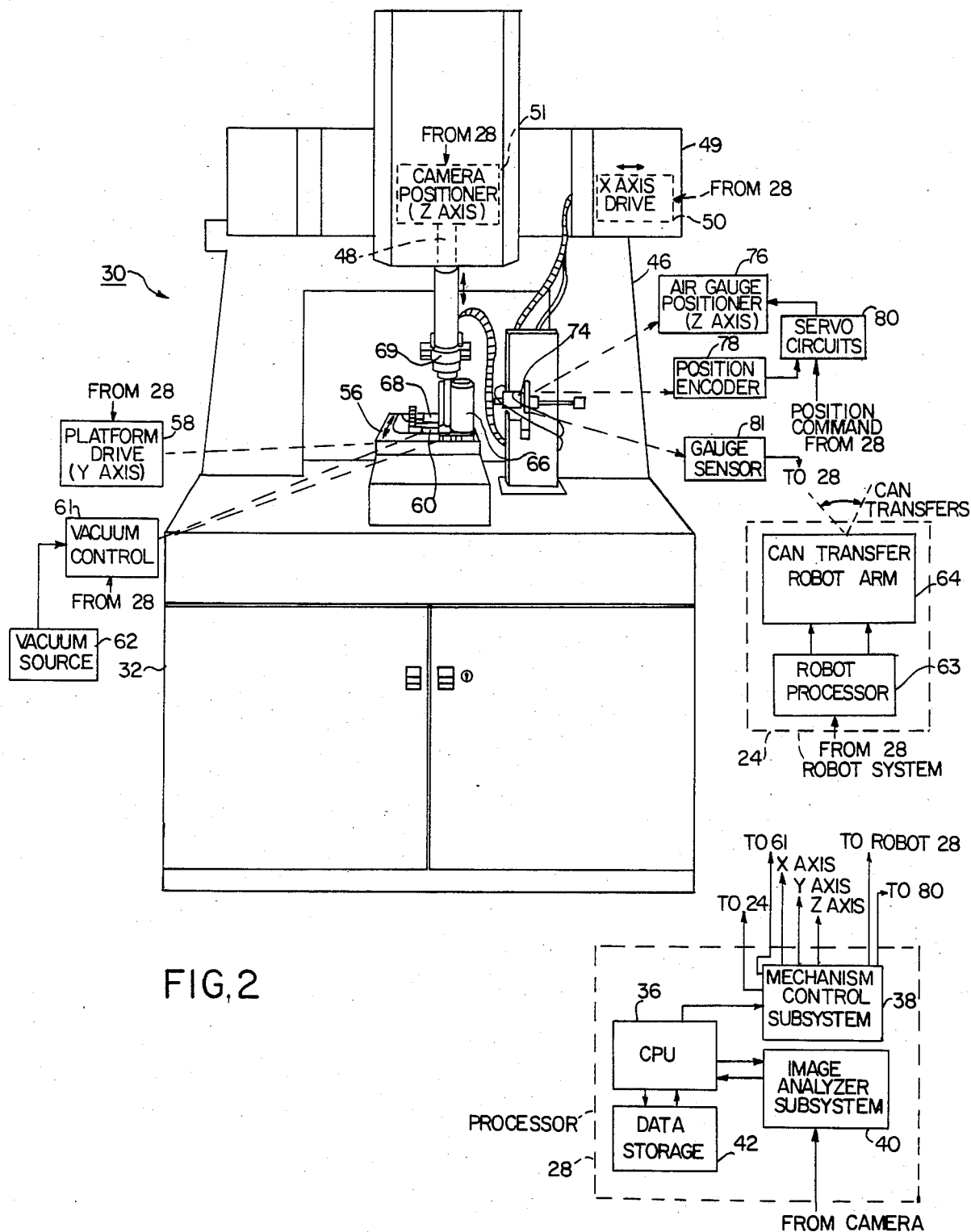
FIG. 2 is a combined perspective and block diagram view of an inspection system employed in the arrangement of FIG. 1, with control units being depicted in block diagram form.

The measuring and inspection system 30 is shown in general form and its principal centrally controllable elements are identified in FIG. 2, to which reference is now made. The system 30 is mounted on a console base 32, shown in only generalized form, which contains a power supply, vacuum source and other features incident to the operation of such a system. Also physically contained within the console base 32 is the processor 28 which includes a central processor (CPU) unit 36 that incorporates hardware, firmware or software processing for functional control of a number of basic elements in the system 30, these being lumped together as the mechanism control subsystem 38. Similarly, hardware, software or firmware programming is used to provide an image analyzer subsystem 40 derived from analysis of a video image and relating to such features as identifying the press 12 (FIG. 1) that formed the can, measuring can width, analyzing the contour of the lip formed at the upper edge of the can, and the like. The processor 28 also includes data storage means 42 for recording historical data as to the operation of the various presses 12. Communications, output printing, alarm and signaling functions which result from the analysis of the data generated are not shown in detail, for brevity and simplicity, although it will be appreciated that threshold conditions can be established for manufacturing variables, and that the processor 28 can signal an operator as to the onset of conditions, can provide output commands or even control operation of the presses 12 themselves in the sense of shutting down a press when product reaches the stage of being out of specification.

Figure 3:
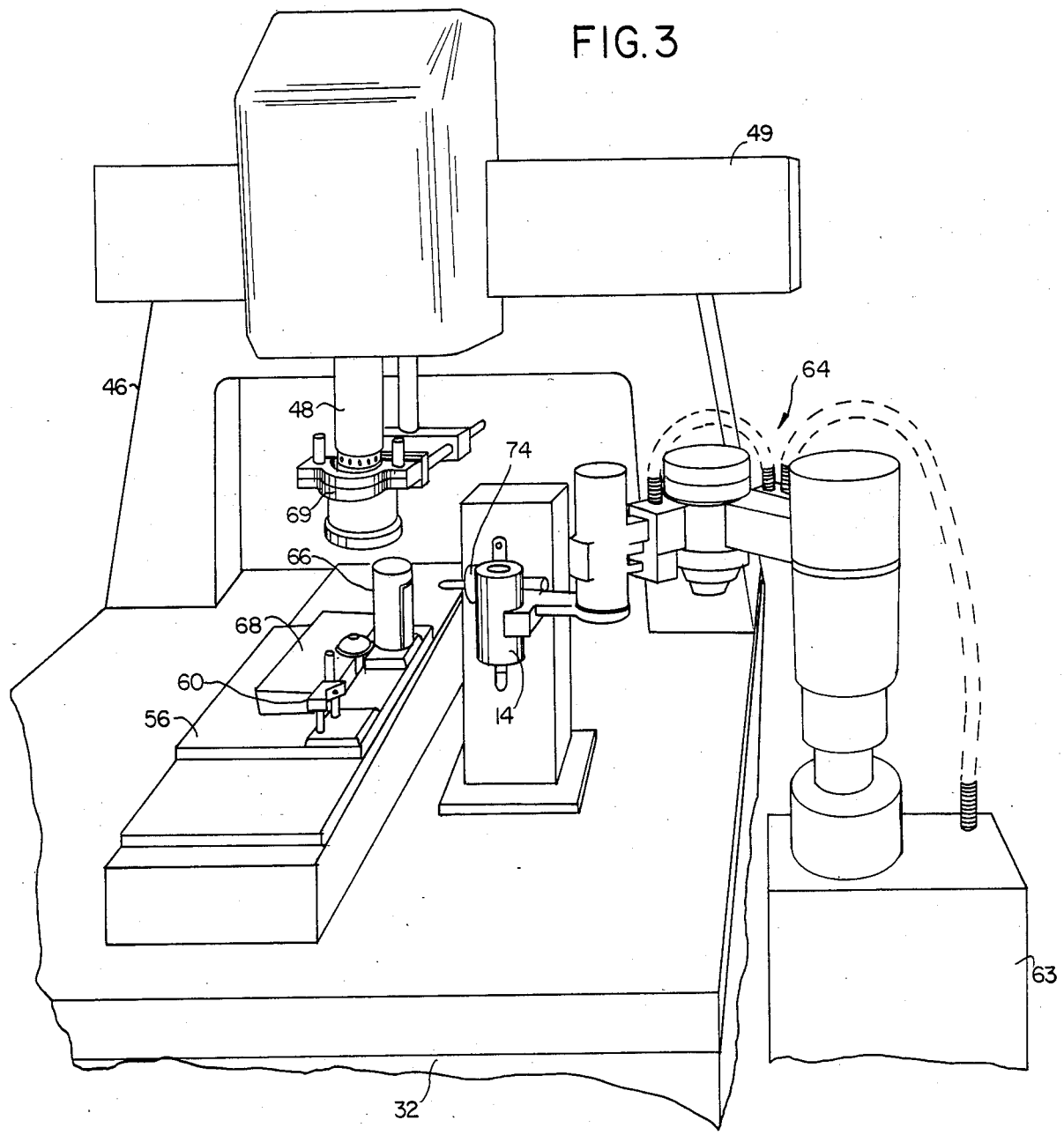
FIG. 3 is a fragmentary perspective view of some mechanical aspects of the inspection system of FIGS. 1 and 2.
Figure 4:
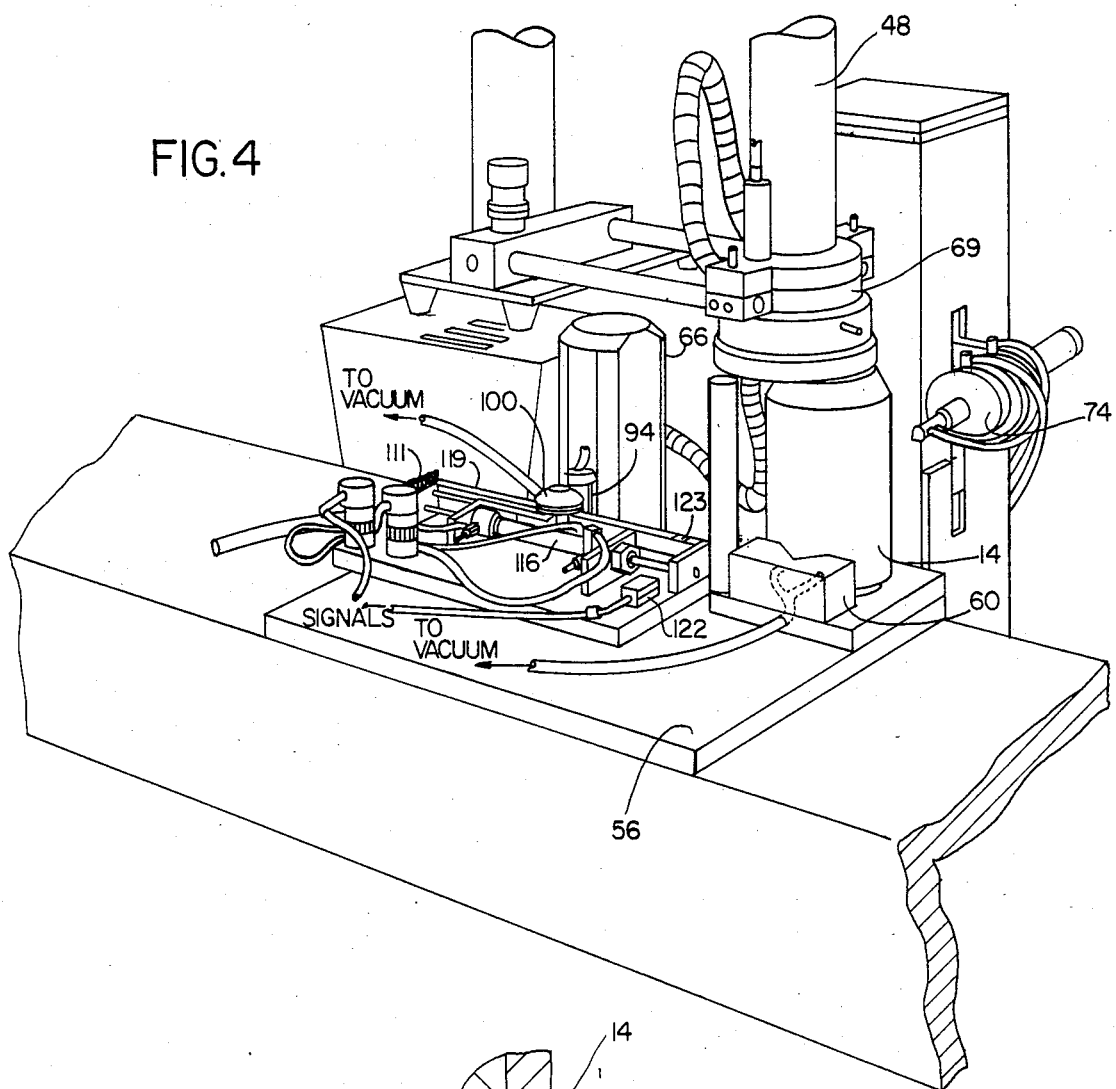
FIG. 4 is a different fragmentary perspective view of the arrangement of FIG. 3.

Referring now to FIGS. 3 and 4 as well as FIG. 2, the console base 32 has a temperature stable flat granite surface surmounted by a structural bridge 46 which spans an inspection zone, to provide a support of adequate stability and rigidity adequate to permit video imaging at high magnification video analysis. A video camera 48 having high magnification optics (not shown in detail) is mounted to move with an X axis carriage 49 that travels laterally on the bridge 46 under processor signals that actuate an X axis drive 50. A camera positioner 51 on the bridge 46 controls focusing of the camera 48 on the Z axis toward and away from a can 14 being inspected. A viewing inspection zone is established between the bridge 46 and a horizontally movable stage or platform 56 on the base 32 which is reciprocable in the Y direction by a platform drive 58 controlled from the processor 28. The platform 56 includes a V block 60 (better seen in FIGS. 3 and 4) adjacent which a can 14 may be placed in upright position. The V block 60 includes surface apertures in the sides of the V (see FIG. 4) leading through a vacuum control 61 to a vacuum source 62, such that a can 14 placed in approximate position adjacent the V block is drawn gently but firmly into the apex of the V and therefore precisely positioned. This position is utilized for image analysis of the can 14.

The robot system 24, which may be a commercially available device, includes its own programmable processor 63 for controlling a robot arm 64 for engagement and movement of cans 14 between defined three dimensional positions. The processor 28 signals the robot system 24 when these transfers are to take place.

Wall thickness measurement is undertaken after placing a can in inverted position on an upstanding mandrel 66 between the horizontal platform 56 and one vertical side of the bridge 46. The vacuum control 61 also applies a vacuum to grip a can 14 against the mandrel 66 surface on command. A rotary indexer 68 is mounted on the platform 56 closely adjacent to the mandrel 66 when the platform 56 is moved horizontally to a selected location. An illuminator 69 concentric with the camera 48 (coaxial illumination can be used alternately or additionally) may be separately controlled by the processor 28 so as to provide best highlights and shadows on the image then in view.

An air gauge 74 having a tip pointing toward the mandrel 66 is mounted on a vertically movable air gauge positioner 76 (shown separate for clarity) supported on the adjacent upstanding arm of the bridge 46. A linear position encoder 78 provides actual position signals to servo circuits 80 which also receive position commands from the processor 28, to control the positioner 76. A sensor 81 on the air gauge 74 returns position signals to the processor 28.

The functioning of the system of FIG. 2 can be described in general terms to set the context for the operation of specific mechanisms. As described in conjunction with FIG. 1, a can 14 is taken from the staging area by the robot mechanism 24 for transferring to the measurement and inspection system 30. It is delivered either upright to the optical position V block 60, or inverted and placed on the mandrel 66. For placement adjacent the V block 60, the horizontal platform 56 is moved to a predetermined Y axis position clear of the bridge 46. Assuming that an optical inspection is to be undertaken first, the can 14 on the V block 60 and the camera 46 are moved in X and Y so that the optical axis of the camera 48 is centered on a selected portion of the can 14. The processor 28 then commands the Z axis positioner 50 to focus the image and, if desired, changes the illumination. Video image signals are then returned to the image analyzer subsystem 40. Presently commercially available systems of View Engineering Inc., assignee of the present application provide complex analysis of surface, dimensional and pattern characteristics of images, so that these need not be described in general terms. However, the present system is unique in applying such image analysis functions to the particular problems of production of open-ended cylindrical containers. The press forms the cans 14 with a characteristic shallow punch pattern, using different positions in a rectangular matrix, although a wide variety of visual indicia may be utilized. A specific can can thus be identified first as coming from a particular press. Subsequently, the camera 48 can be focused on a different characteristic inspection feature, such as the flange or lip formed at the open end of the can 14. The camera 48 and can 14 can be moved relatively in X and Y so that the lip is scanned and analyzed for dimensions, uniformity and certain characteristic faults. In the processor 28 the image analyzer subsystem 40 then provides data for retention to the data storage 42, at the same time providing an output indication to monitoring circuits if the can 14 is not within specified tolerances.

Referring now to FIGS. 3-7, a different can 14 is placed in an inverted position on the mandrel 66, for mapping the wall thickness at a multiplicity of points. With the can 14 on the mandrel 66, the vacuum control 61 is actuated to draw the variable thickness can wall against the side of the mandrel 66 that is opposite the air gauge 74. The processor 28 commands the air gauge positioner 76 to sequence the air gauge 74 along the length of the can 14, taking very accurate measurements of wall thickness at precisely defined points, as controlled by the servo 80 in response to actual position signals derived from the encoder 78. At each position, the sensor 82 provides an analog signal that is converted to a digital value and returned to the processor 28 for entry in the storage 42 and for analysis in accordance with any algorithm desired.

When a line of readings has been taken along the can 14, the vacuum control 61 turns off the vacuum at the mandrel 66, releasing the can 14, and the rotary indexer 68 is operated by the processor 28, engaging the surface of the can and rotating it through a specific angle, about the mandrel 66. The can 14 is then again engaged against the mandrel surface opposite the air gauge 74, by the vacuum control 61, and another sequence of readings is taken along the length of the can by the air gauge device. Typically, three or four angularly spaced lines along the length of the can are scanned to provide hundredths of readings, adequately mapping the thickness variations and providing a comprehensive statistical base for monitoring the performance of each of the presses. The entire inspection operation can be completed in about 1 minute from the initial placement of the can 14 in the inspection zone. A rate of 40 cans per hour is readily achieved for thickness measurements.

Further details of these mechanisms are shown in FIGS. 3, 4, 5 and 7. The mandrel 66 has a curved reference surface 90, FIG. 5, defining a central reference line on the side opposing the air gauge 74. The radius of curvature is slightly less than the nominal radius of curvature of a can 14, and the curved surface covers only an arc of approximately 90°, so that the remainder of the circumference of the can is not restricted and can deform freely to the limited extent needed. The curved surface 90 includes longitudinal surface grooves 92 and internal conduits 93 which lead to the vacuum control 61. On the opposite side from the curved surface, a mandrel roller 94 (FIG. 7) is mounted rotatable about a vertical axis, with its outer periphery spaced from the reference surface 90 by a distance only slightly less (0.005") than the inner diameter of a can 14. The roller 94 is spaced apart from a rotatable hub 100 having a peripheral contact ring 102 of rubber or other elastomeric material for high friction but low abrasion contact against a can wall that fits between the rotor 94 and the ring 102. A pinion 104 beneath the hub 100 is driven by a movable rack 106 mounted on the rotary indexer 68, a drive device on which moves longitudinally along the horizontal platform 56, so as to move the rack 106 tangentially to the pinion 104 over a selectable distance.

To rotate the can through a selected angle, the rotary indexer 68 includes a guide rod 112 parallel to a reciprocable air cylinder 116 having a fixed internal piston 117 and mounted on a central shaft 118 extending through the ends of the cylinder 116. An end bracket 119 on the cylinder 116 is coupled to the rack 106, which slides between grooves in the associated frame. The cylinder 116 is driven through a selected distance by air pressure supplied through control valves 120 operated from the processor 28. A variable stop is positionable on the base of the rotary indexer 68 to permit rotation of the can 14 through any angle up to 180°. In this example the limit of travel is defined when the leading end of the cylinder 116 engages the actuator of a variable positionable switch 122 (e.g. a "Microswitch"). The switch 122 signals that the limit position has been reached and the processor 28 operates a control valve 120 to return the cylinder to its original position.

To prevent the return movement of the cylinder 116 from rotating the can 14 back to its prior position, and to provide clearance for placement and removal of a can on the mandrel, a pivotable drive device is used. The shaft 118, cylinder 116, and the rack 106 are mounted on a pivotable frame 119 that turns about a pivot pin 123 on the platform 56. The rack 106 and hub 100 are normally held away from the roller 94 by a tension spring 111 coupled to the platform 56 at one end and the frame 119 at the other. The rack 106 is longitudinally slidable along the frame 119 on internal grooves, and the pinion 104 is also rotatably mounted on the frame 119. A small pneumatic cylinder 113 adjacent the free end of the frame 119 receives air pressure before longitudinal movement starts and urges the frame 119 toward the can and the roller 94 on the mandrel 66. This moves the hub 100 and friction ring 102 about $\frac{1}{8}$" against the spring 111, engaging the can 14 (not seen in FIG. 7) and allowing rotation to take place as the linear motion of the cylinder 116 and rack 106 turns the pinion 104 and friction ring 102. At the limit position, when linear movement stops, the air pressure is turned off and the small cylinder 113 rapidly depressurizes, allowing the spring 111 to pull the frame and friction ring 102 away from the can before return movement of the rack 106 begins.

Figure 6:
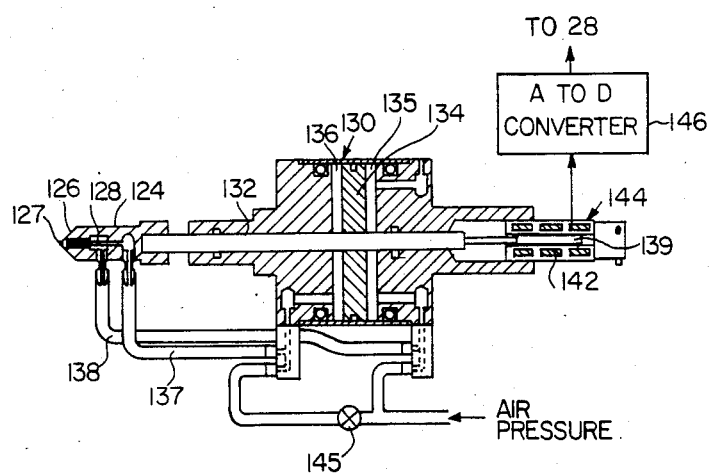
FIG. 6 is a side elevational view of the air gauge of FIG. 5.

The sectional view of FIG. 6 show further details of the air gauge 74, which terminates in a restricted nozzle 124 facing toward the mandrel 66. This mechanism is typified by the "Non-Contacting LVDT Gage Heads" of Schaevitz Engineering, Pennsauken, N.J., and is therefore only generally described. The nozzle 124 has a tapering tip 126 including a sensing orifice 127 and an interior tube 128 in communication with the sensing orifice 127. An air cylinder 130 mounted coaxially with the nozzle supports a slidable concentric piston rod 132 and an interior piston 134 defines an internal reference chamber 135 and a control pressure chamber 136 on opposite sides of the cylinder 130. A pressure line 137 from the control pressure chamber 136 is coupled to the tube 128 within the nozzle 124, while a second line 138 is coupled between the reference chamber 135 and the control pressure chamber 136. A piston rod 132 extension supports a core 139 within a linear variable differential transformer 144. An interior coil 142 in the transducer 144 about the core 139 provides an analog signal representative of core 139 position in conventional fashion. A valve 145 in the input pressure line can be closed to retract the nozzle 124 for clearance. Analog signals from the transducer 144 are applied to an A-D converter 146, which returns digital data to the processor 28.

With this construction, the back pressure developed by discharging air at the nozzle 124 varies with the gap, typically about 0.003", of the sensing orifice 127 from the can 14. The gap-dependent pressure is fed back to the control pressure chamber 136, and the pressures in the two chambers 135, 136 are equalized. A change in the wall being measured causes readjustment of the stable position to maintain back pressure constant.

The device of FIGS. 3-7 operates without scratching or mishandling of cans 14, to measure can thickness to one-half micron (23 millionths of an inch) accuracy. The air gauge 74 is first scanned along the reference surface 90 to derive a succession of reference readings, which are digitized and entered in data storage 42 to represent zero values for subsequent readings. At the levels of precision that are desired, temperature and other effects can cause temporary variations in the reference surface position, although these variations are much longer in term than is required for readings relative to a can. Consequently, the stored reference position readings, accurate to half micron values, are valid for use with a number of cans, even though the reference scan is made only once for each different can.

Figure 8:
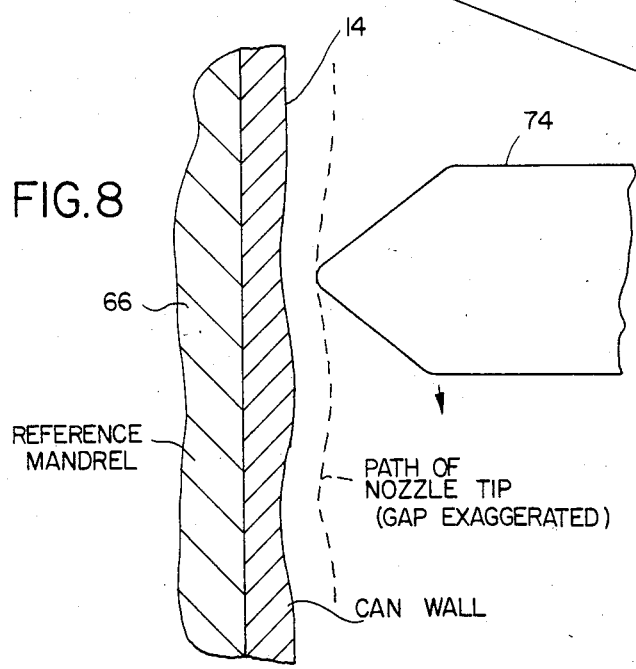
FIG. 8 is an enlarged, somewhat simplified fragmentary side view of variations in a can when positioned against a mandrel.

When the vacuum is drawn on the mandrel 90, at the surface grooves 92, the can 14 is pulled onto the curved reference surface and its inner side is flattened against that surface 94, as shown in FIG. 8, so that variations in thickness appear as a varying curvature of the outside wall of the can 14. The can is deformed slightly to the lesser curvature, in the horizontal direction, of the mandrel surface 90, but the deformation is mechanically compensated by slight distortion in the free portion of the can 14. The air gauge 74 can then take measurements of the wall thickness. The position of the sensing orifice 124, determined by the transducer 144, is determined by the hydrodynamic balance achieved by the air gauge 74. As many readings as are desired are taken, typically 10 to 15 per inch are taken, along the length of the scan path. The air gauge, positioner 76 is stepped between closely spaced positions, as commanded by the processor 28 and determined by the encoder 78 and servo 80. The air gauge 74 need only be held at each position for an interval on the order of a millisecond. The digitized signals provided from the converter 146 as each position is read are sent to the processor 28, where they are compared to the stored reference values and wall thickness measurement values in millionths of an inch are computed.

When a line of readings on the can have been completed, and the vacuum has been released so that the can is 14 free to rotate, the rotary indexer 68 turns the can through the selected angle for the next line of readings. In this fashion the entire wall is rapidly mapped with several hundred or more readings.

The presently disclosed system provides the first known versatile, rapid non-contact analytical system for hollow cylindrical products such as aluminum cans. The geometry and structure of the system provides stable positioning for vibration free analysis but enables alternative optical and air gauge inspection so that a great range of data can be acquired automatically. The cans are transferred and positioned rapidly without danger of deformation or damage. The inspection devices are compactly arranged so that three dimensional operation is feasible with each, as required by the circumstances.

Although various forms and variations have been described it will be appreciated that the invention is not limited thereto but encompasses all expedients and variations in accordance with the appended claims.

What is claimed is:

1. A system for inspecting cylindrical products having one open end after being formed on rapidly acting machines comprising:
   means including staging area means for selecting individual products from the different machines;
   transfer means for displacing successive individual products from the staging area means to an inspection zone;
   an inspection machine at the inspection zone, the inspection machine including vetically disposed optical means for measuring dimensions and movable non-contact means for measuring the thickness of the side wall at a multiplicity of points; and
   data processing means including data storage means, the data processing means storing historic data as to product measurements from individual machines and indicating the existence of a predetermined level of unacceptability.

2. The system as set forth in claim 1, wherein the non-contact means for measuring comprises a reference surface mandrel insertable in the open end of the cylindrical product, a movable air gauge including nozzle means disposed adjacent the mandrel and means for moving the nozzle means adjacent the mandrel reference surface at a predetermined gap relative to an adjacent thickness of the cylindrical product and signal generating means responsive to variations in the position of the nozzle means.

3. The system as set forth in claim 2 above, wherein the system further includes vacuum means cooperatively disposed with the reference surface of the mandrel, and operative to draw the wall of the cylindrical product onto the reference surface mandrel.

4. The system as set forth in claim 3 above, wherein the system further comprises means for engaging the cylindrical product and rotating it through limited angles such that successive lines along the length of the side wall are scanned and responsive electrical signals derived.

5. The system as set forth in claim 4 above, wherein the means for rotating comprises a roller positioned within the product and an opposed drive outside it, and wherein the system further comprises means for disengaging the product from the mandrel.

6. The system as set forth in claim 5 above, wherein the vacuum means and the means for engaging comprises surface depressions in the mandrel surface and means for controlling the application of negative pressure thereto, wherein the nozzle means scans along a line parallel to the central axis of the cylindrical product, and wherein the mandrel has a curved surface about the central axis with a radius of curvature no greater than that of the cylindrical product.

7. The system as set forth in claim 2 above, wherein the means for moving the nozzle means linearly scans along successive lengthwise lines on the cylindrical product and the system maps the wall thickness at a multiplicity of positions at different quadrants about the product.

8. The invention as set forth in claim 1 above, wherein the inspection means comprises platform means movable along a first horizontal axis for retaining products in one of two positions thereon.

9. The invention as set forth in claim 8 above, wherein the inspection means further comprises bridge means spanning the platform means and including means movable along a second horizontal axis orthogonal to the first, and the optical means comprises video camera means mounted on the bridge means and vertically movable thereon.

10. The invention as set forth in claim 9 above, wherein the bridge means includes side supports and the movable non-contact means is mounted to be vertically movable on one of the side supports.

11. The method of measuring the thickness of an open-ended aluminum can wall adjacent a reference mandrel having a linear surface comprising the steps of:
   scanning the linear surface of a mandrel along its length at a predetermined spacing to provide a number of reference readings;
   fitting the open end of the can over the mandrel;
   drawing a side of the can wall into full contact with the linear surface of the mandrel;
   scanning the surface of the can along the linear surface path at a predetermined distance to provide a number of can wall readings; and
   determining the difference between the reference readings and the can wall readings to provide a multiplicity of wall thickness values.

12. The method of claim 11 above, wherein the can wall readings are non-contact readings established by hydrodynamic balancing at uniform spacing from the surface.

13. The method of claim 12 above, wherein the predetermined distance from the surface is in the range of approximately 0.003" and including the steps of directing an air jet against the surface to maintain a predetermined distance from the opposed surface, and generating an electrical signal representative of changes in position during scanning.

14. An inspection and measurement system comprising:
   a stable base having a horizontal upper surface;
   a stable bridge spanning the upper surface in an X axis direction and overlying a viewing zone on the base;
   platform means on the upper surface of the base, the platform means including Y axis drive means for providing horizontal movement in the Y direction and means defining a first inspection position for an object to be analyzed;
   X axis carriage means mounted on the bridge and including X axis drive means for providing horizontal movement in the X direction;
   Z axis support means mounted on the X axis carriage means and including drive means for providing vertical movement;
   electronic camera means mounted on the Z axis support means and oriented to view the viewing zone along an optical axis;

mandrel means mounted on the viewing platform and a side of the bridge for defining a second inspection position; and non-contact sensing means coupled to the bridge adjacent the mandrel means and vertically movable to scan an object at the mandrel means, whereby arbitrarily selected regions of objects can be alternatively subject to image analysis under the camera means or non-contact measurement by the sensing means.

15. The invention as set forth in claim 14 above, further including data processor means coupled to the Y axis drive means, the X axis drive means the Z axis drive means for sequencing the system through three dimensions to inspect and measure different parts of an object under analysis.

16. The invention as set forth in claim 15 above, wherein the object is a cylindrical open ended product and the mandrel means is vertical and registers within a product thereon, and wherein the system further includes means for turning the product on the mandrel to different scanning positions.

17. Apparatus for measuring the wall thickness of a thin-walled aluminum can at a plurality of points about the surface comprising:

a mandrel having a diameter registering within a can, the mandrel having a reference surface and including means for controllably drawing a portion of the can wall tightly against the reference surface;

scanning means disposed adjacent the reference surface for non-contact measurement of the distance between the outer surface of the can and the reference surface at a number of spaced apart points;

first roller means disposed at the mandrel within a can registered thereon, the roller means being rotatable about an axis parallel to the axis of the can; and drive roller means disposed adjacent the first roller means and including means for engaging the can against the first roller means to rotate the can through a selected angle about its axis.

18. The invention as set forth in claim 17 above, wherein the drive roller means comprises pivotably mounted frame means, a friction drive roller mounted on the frame means adjacent the first roller means, linear motion means on the frame means for rotating the friction drive roller through a selected angle, and means for pivoting the frame means away from the first roller means.

19. The invention as set forth in claim 18 above, wherein the linear motion means comprises air cylinder means mounted on the frame means for linear motion, rack means mounted on the frame means parallel to the air cylinder means and coupled thereto, and pinion means engaging the rack means and driving the friction drive roller.

20. The invention as set forth in claim 19 above, further including means defining stop means variably positionable to limit the motion of the air cylinder means, spring means coupled to the frame means to bias the frame means away from the first roller means, and second air cylinder means engaging the frame means to pivot the friction drive roller into engagement against the spring means.

21. A mechanism for measuring the thickness of the wall of a thin walled cylindrical object at a plurality of points comprising:

mandrel means registrable within the object, the mandrel including a curved reference surface on one side and a roller on the other, the reference surface including depression thereon;

means coupled to the mandrel means for providing reduced differential pressure at the concavities to draw a part of the wall of a cylindrical object registered thereon closely onto the reference surface;

first roller means coupled to the mandrel means and disposed adjacent and within the wall of the cylindrical object opposite the reference surface when the object is on the mandrel;

pivoted rotary indexer means disposed adjacent the mandrel means, the rotary indexer means including friction roller means rotatable through a given angle, and engaging the object wall against the first roller means when the indexer means is pivoted toward the mandrel means;

means for pivoting the indexer means toward and away from the mandrel means; and non-contact means disposed adjacent the reference surface for scanning the wall of an object along the reference surface to measure the spacing of the outer surface thereof from the reference surface.

22. The invention as set forth in claim 21 above, wherein mandrel means comprises a vertically disposed element, the indexer means comprises linear motion device for rotating the friction roller means, and the indexer means further comprises means for pivoting to disengage the friction roller means from the object.

* * * * *